3,047,621
PURIFICATION OF PHTHALIC ACIDS
Cilton W. Tate, Decatur, Ala., assignor, by mesne assignments, to Monsanto Chemical Company, a corporation of Delaware
No Drawing. Filed Apr. 6, 1959, Ser. No. 804,104
6 Claims. (Cl. 260—525)

This invention relates to a method of preparing phthalic acids from impure mixtures as obtained by the oxidation of dialkylene benzenes. More particularly, the invention relates to a method of preparing pure terephthalic acid from impure mixtures as obtained by the oxidation of para-xylene with molecular oxygen or an oxygen-containing gas.

It is known that para-xylene, isomers thereof, and similar dialkylbenzenes wherein the alkyl groups may be higher than methyl, for example, ethyl, propyl, butyl, and higher can be converted to phthalic acids by the so-called liquid-phase air oxidation process. One commercial process employing this oxidation technique involves the use of halogen activation of a metal that catalyzes the air oxidation of the alkyl groups or the benzene ring; air is used although oxygen or other molecular oxygen-containing gas can be used. This commercial process is attractive because of its flexibility and lowness of cost. However, the phthalic acids prepared in this manner contain undesirable impurities. Prior art attempts at separating the phthalic acids from these impurities have not been entirely successful.

Terephthalic acid, as well as isophthalic acid to a limited extent, is used today in large quantities as an intermediate in the preparation of synthetic linear polyesters having film- and fiber-forming properties. Contrary to what may seem to be the most attractive method for producing polyethylene terephthalate, viz., simply reacting terephthalic acid with ethylene glycol, the process for virtually all commercial production of such polymer involves first forming the dimethyl ester derivative of terephthalic acid and then carrying out an ester-interchange reaction between this derivative and ethylene glycol to form bis($\beta$-hydroxyethyl) terephthalate monomers or lowly polymerized polymers thereof which are polymerized subsequently to polyethylene terephthalate of suitable molecular weight. This commercial process is used because of the lack of rapidity of reaction between terephthalic acid and ethylene glycol as compared with the reaction between dimethyl terephthalate and ethylene glycol. A concomitant reason for the employment of dimethyl terephthalate rather than terephthalic acid is that dimethyl terephthalate can be subjected conveniently to conventional purification techniques whereas terephthalic acid can not.

However, recently a method of directly condensing terephthalic acid of high purity and ethylene glycol under controlled conditions to produce polyethylene terephthalate having excellent film- and fiber-forming properties at a rapid rate was discovered.

It was found that commercially obtained terephthalic acid manufactured by the above-discussed liquid-phase air oxidation process and purified by known methods unfortunately does not possess the necessary degree of purity for use in the said recently discovered process wherein the acid and ethylene glycol are condensed to form a polymer of excellent fiber-forming qualities. When commercial terephthalic acid produced by the liquid-phase air oxidation proces was reacted with ethylene glycol, the polyethylene terephthalate obtained was extremely poor in color (somewhat black) and had a substantially reduced melting point with the degree of crystallinity of polymer being unsatisfactorily low as compared with the crystallinity of polyethylene terephthalate produced via the ordinary ester-interchange method. The reduced melting point and reduced crystallinity of the polymer are attributed to the formation of polyglycol ether esters therein, which, even in small amounts, adversely affect these important properties. While it is not entirely clear why such formation occurs, one explanation is that the presence of certain acidic or acid-forming impurities indigenous in the liquid-phase air oxidation process or similar impurities extraneously introduced by purification techniques, catalyzes the production of the undesirable polyglycol ether esters.

Moreover, the impurities in the terephthalic acid which are indigenous to the method of preparation are not removed readily by adsorption on charcoal. Some of these indigenous impurities are highly colored and others are not as they exist in the commercial terephthalic acid. Those that are colored transfer their color to the polymer made therefrom and the colorless ones are ordinarily heat-unstable so that they undesirably impart color to the polymer when subjected to elevated temperatures. Thus, a treatment was needed which would degrade or transform the indigenous impurities in phthalic acids produced by the liquid-phase air oxidation process so that they are converted into a form easily and conveniently separable from said terephthalic acid.

Therefore, it is a general object of the present invention to provide a new and improved proces for purifying phthalic acids. It is a further object of the present invention to provide a new and improved method of purifying terephthalic acid as obtained by the liquid-phase air oxidation of para-xylene. It is another object of the present invention to provide a new and improved method of purifying terephthalic acid as obtained by the liquid-phase air oxidation process of para-xylene such that the purified acid may be used to react directly with ethylene glycol so as to produce a linear polyester from which excellent fibers and the like may be manufactured. Other objects and advantages of the present invention will be apparent from the following detailed description.

In accordance with the present invention, a method has been found for effectively and efficiently purifying phthalic acids, and particularly terephthalic acid prepared by the air oxidation process as above described. This is accomplished by dissolving the impure phthalic acid in an aqueous alkaline solution to form a salt of the phthalic acid, preferably an alkali metal or ammonium salt. While in this alkaline medium the salts of the phthalic acid are contacted with an oxidizing agent such as sodium or potassium permanganate, sodium or potassium dicromate, and the like. Following this step, the solution containing the salt of the phthalic acid to be purified is treated with activated carbon. After such treatment, the phthalic acid is precipitated by adding the salt of the phthalic acid to an acid having an ionization constant greater than that of the phthalic acid and thereafter is separated. Then, the phthalic acid is washed, preferably with hot water. The phthalic acid obtained according to the process is a pure or substantially pure compound.

In practicing the invention the impure phthalic acid is dissolved in an aqueous alkaline solution which can be, for example, bases such as an aqueous ammonium hydroxide solution, sodium hydroxide solution, potassium hydroxide solution, organic bases such as trimethylamine, and the like. The concentration of the base used can vary a considerable extent, the requirement being that sufficient base must be used to dissolve the quantity of phthalic acid to be purified. The temperature at which the phthalic acid is dissolved in the aqueous alkaline solution is not critical and for convenience is usually around room temperature. However, it will be appreciated that the phthalic acid may be more quickly dissolved at elevated temperatures.

The oxidizing agent which preferably is potassium or sodium permanganate can be added to the aqueous alkaline solution after the phthalic acid is dissolved therein; when added, the oxidizing agent can be a solid or it may be dissolved in a liquid such as water. The temperature at which the salt of the phthalic acid is treated with the aforesaid oxidizing agent can be varied over a wide range. Normally, operating temperatures of about 25° C. to 100° C. can be used in this step to produce the ultimately purified phthalic acid within a reasonable length of time. More preferably, the temperature will be from about 25° C. to about 50° C. where most favorable treatment is attained, although treating temperatures as low as 0° C. and as high as 100° C. may be used. At low temperatures slower reactions are encountered. The time during which the alkaline salts of the phthalic acid are in contact with the oxidizing agents likewise can be varied depending to some extent upon the temperature of treatment and the nature of the phthalic acid and the oxiding agent. Treatment times from about 30 to 180 minutes are ordinarily employed, it being understood of course that the shortest contact time consistent with desired purity of the phthalic acid will normally be used. The amount of permanganate or dichromate required to treat a particular impure phthalic acid will vary. It has been found that 3 to 4 grams of potassium permanganate is normally required to treat 100 grams of commercially procured terephthalic acid prepared by the aforesaid air oxidation method. Lesser amounts of oxidizing agents might necessitate a second treatment to attain the desired purity. On the other hand excessive amounts of oxidizing agents may represent a waste of materials. A simple procedure for determining whether sufficient oxidizing agent is employed is to observe the color of the alkaline terephthalate solution to which the oxidizing agent is added. For example, if the solution remains a slight purple color for a period of 5 minutes when potassium permanganate is the oxidizing agent, then sufficient agent has been employed. However, if the solution becomes colorless within 5 minutes, then sufficient permanganate has not been employed.

It is understood also that the phthalic acid may be treated with the oxidizing agent in either batch or continuous processes.

The thus-treated alkaline salts of phthalic acids are next treated with a high grade activated carbon or the like. This treatment may be accomplished in a variety of ways. For example, the solution may be permitted to flow in a continuous fashion by gravity or forced through a column or like device containing the activated carbon. The contact between the solution containing the alkaline salts of the phthalic acid is maintained until at least the discoloration of the solution that is ordinarily present is substantially eliminated. Alternatively, activated carbon, preferably in powdered form, is added to the solution with the resulting mixture being stirred. Again, the time necessary to accomplish the removal of the discoloration depends on many process conditions, namely the temperature, the specific type of carbon, etc.

Following its contact with activated carbon, the solution thus-treated is separated from the carbon by conventional processes, for example, by filtration, centrifugation, and the like.

The phthalic acids are regenerated from the alkaline solution with an acid that is a stronger acid than terephthalic acid. This is accomplished by acidifying the phthalate containing solution by adding the solution to the neutralizing and precipitating acid. It will be appreciated that the amount of acid required is preferably at least a stoichiometric quantity. In addition to sulfuric acid used below in the examples any acid having an ionization constant greater than that of terephthalic acid is suitable, of course, such as hydrochloric acid, acetic acid, sulfurous acid, and nitric acid. Thereafter, the precipitated phthalic acids are separated from the solution at a convenient temperature by filtration or like conventional operations and washed thoroughly with water, preferably hot water above 60° C. and perhaps exceeding the boiling point of the water when superatmospheric pressure is employed. If desired, the thus-treated phthalic acids then are dried, for example, by placing same in a heated oven or by the use of other conventional drying techniques.

It is quite unexpected that the terephthalic acid treated according to this invention could be used to make a satisfactory polyethylene terephthalate by a direct reaction between the acid and ethylene glycol in view of the fact that when the acid is regenerated under commonly used conditions of adding a precipitating acid to the aqueous alkaline solution of the terephthalate salt, the required degree of purity can not be obtained conveniently. Therefore, it is seen that it is highly important to the proper practice of this invention that in the regeneration step the solution containing the ammonium salt is added to the acid rather than by adding the precipitating acid to the ammonium salt solution; otherwise, the improved results in regard to the production of polyethylene terephthalate of excellent quality are not attained.

Based on the foregoing discovery, it is thought that when the acid is regenerated by adding the precipitating acid to the solution containing the ammonium terephthalate, the ionizable acidic and acid-forming impurities become occluded in the terephthalic acid to such an extent that they can not be subsequently removed effectively therefrom.

Further details of the practice of the invention are set forth in the following specific examples that show the contrasting results obtained when terephthalic acid prepared by the air oxidation process is purified in and not in accordance with the present invention. It is to be understood, however, that there is no intention of being limited by the below described details of operation since numerous variations and modifications, which are within the scope of the appended claims, will be apparent to those skilled in the art; for example, while the examples show only the purification of terephthalic acid, the process can be applied as well to the purification of all three phthalic acids. Unless otherwise designated all parts and percentages are by weight.

*Example 1*

This example shows the purification of terephthalic acid without the dichromatate or permanganate treatment.

Two hundred and fifty grams of commercially produced terephthalic acid prepared by the aforesaid air oxidation process was dissolved in a solution composed of 2800 grams of distilled water and 250 mls. of concentrated ammonium hydroxide at a temperature of 50° C. with stirring. The resulting solution then was passed slowly through a column containing 15 grams of activated carbon. The temperature at which the carbon treatment was carried out was 25° C. and the rate that the ammonium terephthalate solution passed through the carbon column was about 750 mls. per hour. The carbon was purchased under the name of Darco G–60, a high grade activated charcoal. After being passed through the column of carbon, the solution was slowly added with stirring to a dilute solution of sulfuric acid, which was present in a container in slightly more than the stoichiometric amount needed to regenerate and to precipitate the terephthalic acid. Then, the precipitated acid was separated by filtration through a Buchner-type funnel and was washed thoroughly with water a temperature of almost 110° C. after which it was air dried in a circulating oven.

A slurry consisting of 66.4 grams of this purified terephthalic acid and 248 grams of ethylene glycol was heated in a stainless steel autoclave at a temperature of 221–231° C. and under a gauge pressure of 25 to 27 pounds per square inch for 20 minutes in an atmosphere of nitrogen gas. During the reaction induced between the acid and glycol, 38 mls. of distillate was collected. The resulting reaction mixture was transferred to a glass polymerization vessel with 60 mgs. of zinc acetylacetonate being added as a polymerization catalyst. While the mixture was being stirred at 285° C. excess glycol was distilled off. Thereafter, the reaction mixture was subjected to a reduced pressure of less than 0.3 mm. of mercury at the same temperature for 70 minutes. The polymerizing mixture rapidly darkened in color and then became black. The resulting polymer was a glass-like substance melting below 200° C. and was unsuitable for the formation of strong fibers. This example shows that when terephthalic acid in the form of a dissolved salt is not treated with the oxidizing agents, it reacts with ethylene glycol under the just-mentioned conditions to produce a resulting polymer having a poor color and a low melting point.

Example II

This example illustrates the practice of the present invention.

Two hundred and fifty grams of commercially produced terephthalic acid prepared by the aforesaid air oxidation process was dissolved in a solution composed of 2800 grams of distilled water and 250 mls. of concentrated ammonium hydroxide at a temperature of 50° C. with stirring. To the resulting solution 150 mls. of 0.4 N potassium permanganate solution was added at 50° C. with stirring. Celite, a commercial filter aid, was added and the solution was filtered to remove the manganese dioxide that had precipitated. The filtered solution then was passed slowly through a column containing 15 grams of activated carbon as above. The temperature at which the carbon treatment was carried out was 25° C. and the rate that the ammonium terephthalate solution passed through the carbon column was about 750 mls. per hour. After being passed through the column of carbon, the solution was added slowly with stirring to a dilute solution of sulfuric acid (6%) which was present in slightly more than the stoichiometric amount needed to regenerate and to precipitate the terephthalic acid. Then the precipitated acid was separated by filtration through a Buchner-type funnel and was washed thoroughly with water at a temperature of almost 110° C. after which it was air dried in a circulating oven.

The thus-purified terephthalic acid was reacted with ethylene glycol in accordance with the polymerization method outlined in Example I. The polymer obtained thereby was white in color and melted at 257–258° C. Fiber-forming properties of the polymer were excellent.

Example III

The procedure of Example II was duplicated except that the terephthalic acid was regenerated from the ammonium salt solution by adding the 6 percent sulfuric acid solution to the ammonium salt solution. The polymer prepared from this terephthalic acid and ethylene glycol in accordance with the polymerization method outlined in Example I was poor in color and had a low melting point.

Example IV

This example illustrates the practice of the present invention.

Two hundred and fifty grams of terephthalic acid prepared by the aforesaid air oxidation process was dissolved in a solution composed of 2800 grams of distilled water and 250 mls. of concentrated ammonium hydroxide at a temperature of 50° C. with stirring. To the resulting solution, 150 mls. of 0.4 N sodium permanganate solution was added at 50° C. with stirring. Celite, a commercial filter aid, was added and the solution was filtered to remove the manganese dioxide that had precipitated. The filtered solution then was passed slowly through a column containing 15 grams of activated carbon as above. The temperature at which the carbon treatment was carried out was 25° C. The solution was passed through the carbon filled column at a rate of 750 mls. per hour.

After passing through the column of carbon, the solution was added slowly with stirring to a dilute solution of sulfuric acid that was present in a container in slightly more than the stoichiometric amount needed to regenerate and to precipitate the terephthalic acid. Then the precipitated acid was separated by filtration through a Buchner-type funnel and was washed thoroughly with water at a temperature of almost 110° C. after which it was air dried in a circulating oven.

The thus-purified terephthalic acid was reacted with ethylene glycol in accordance with the polymerization method outlined in Example I. The polymer obtained thereby was white in color and the fiber-forming properties of the polymer were excellent.

Example V

This example further illustrates the practice of the present invention.

Two hundred and fifty grams of terephthalic acid prepared by the aforesaid air oxidation process was dissolved in a solution composed of 2800 grams of distilled water and 250 mls. of concentrated ammonium hydroxide at a temperature of 90° C. with stirring. To the resulting solution was added 150 mls. of 0.4 N potassium permanganate solution, the temperature of the reaction mixture being maintained at 90° C. during the addition. Celite, a commercial filter aid, was added and the solution was filtered to remove the manganese dioxide that had precipitated. The filtered solution then was passed slowly through a column containing 15 grams of activated carbon as above. The temperature at which the carbon treatment was carried out was 25° C. The solution was passed through the carbon filled column at a rate of 750 mls. per hour.

After passing through the column of carbon, the solution was added slowly with stirring to a dilute solution of sulfuric acid which was present in slightly more than the stoichiometric amount needed to regenerate and to precipitate the terephthalic acid. Then the precipitated acid was separated by filtration through a Buchner-type funnel and was washed thoroughly with water at a temperature of almost 110° C. after which it was air dried in a circulating oven.

The thus-purified terephthalic acid was reacted with ethylene glycol in accordance with the polymerization method outlined in Example I. The polymer obtained thereby was white in color and the fiber-forming properties of the polymer were excellent.

Example VI

This example further illustrates the practice of the present invention.

Two hundred and fifty grams of terephthalic acid prepared by the aforesaid air oxidation process was dissolved in a solution composed of 3200 grams of distilled water and 130 grams of sodium hydroxide at a temperature of 50° C. with stirring. To the solution was added with maintenance of said temperature 150 mls. of 0.4 N potassium permanganate solution. Celite, a commercial filter aid, was added; and the solution was filtered to remove the manganese dioxide that had precipitated. The filtered solution then was passed slowly through a column containing 15 grams of activated carbon as above. The temperature at which the carbon treatment was carried out was 25° C. The solution was passed through the carbon filled column at a rate of 750 mls. per hour.

After passing through the column of carbon, the solution was added slowly with stirring to a dilute solution of sulfuric acid which was present in slightly more than the stoichiometric amount needed to regenerate and to precipitate the terephthalic acid. Then the precipitated acid was separated by filtration through a Buchner-type funnel and was washed thoroughly with water at a temperature of almost 110° C. after which it was air dried in a circulating oven.

The thus-purified terephthalic acid was reacted with ethylene glycol in accordance with the polymerization method outlined in Example I. The polymer obtained was white in color and the fiber-forming properties were excellent.

Example VII

To demonstrate the necessity of the charcoal treatment, two hundred and fifty grams of commercially produced terephthalic acid prepared by the aforesaid air oxidation process was dissolved in a solution of 2800 grams of distilled water and 250 mls. of concentrated ammonium hydroxide at a temperature of 50° C. with stirring. To the resulting solution was added 150 mls. of 0.4 N potassium permanganate solution at 50° C. with stirring. Celite, a commercial filter aid, was added and the solution was filtered to remove the manganese dioxide that had precipitated.

The solution was added slowly with stirring to a dilute solution of sulfuric acid which was present in slightly more than the stoichiometric amount needed to regenerate and to precipitate the terephthalic acid. Then the precipitated acid was separated by filtration through a Buchner-type funnel and was washed thoroughly with water at a temperature of almost 110° C. after which it was air dried in a circulating oven.

The thus-purified terephthalic acid was reacted with ethylene glycol in accordance with the polymerization method outlined in Example I. The polymer obtained thereby was very dark in color and unsatisfactory for the production of polymers.

Hence, the present invention affords a convenient and expedient method of substantially complete purification of commercial terephthalic acid and the like obtained by the air oxidation of para-dialkylbenzenes. Terephthalic acid treated in accordance with the present invention is eminently suitable for preparing polyethylene terephthalate by condensing the acid directly with ethylene glycol under controlled conditions. The polyethylene terephthalate may be formed into fibers, filaments, films, and like shaped objects that have desirable properties. Numerous other advantages will be apparent to those skilled in the art.

While the present invention has been described with respect to certain of its specific embodiments, it is to be understood that this is merely intended in an illustrative sense and that changes and variations may be made without departing from the spirit and scope of the invention as defined in the appended claims.

What is claimed is:

1. A process for purifying crude phthalic acid obtained by the oxidation of a dialkylbenzene in the liquid phase by means of an oxygen-containing gas which comprises the steps of subjecting said crude phthalic acid to contact in an alkaline solution with at least 3 percent on the weight of said crude phthalic acid of an agent selected from the group consisting of sodium and potassium dichromates and sodium and potassium permanganates for a period of from about 30 to 180 minutes and at a temperature of from about 0° C. to 100° C., thereafter treating said alkaline solution with activated carbon, forming and precipitating phthalic acid by adding the thus-treated solution to a second acid having an ionization constant greater than that of the phthalic acid, separating the precipitated acid therefrom, and then washing the thus-separated phthalic acid with water.

2. A process for purifying crude terephthalic acid obtained by the oxidation of para-dialkylbenzene in the liquid phase by means of an oxygen-containing gas which comprises the steps of dissolving said crude terephthalic acid in an aqueous alkaline medium to form a soluble salt of said terephthalic acid, subjecting the salt of said terephthalic acid to contact in the aqueous alkaline medium with at least 3 percent on the weight of said terephthalic acid of an agent selected from the group consisting of sodium and potassium dichromates and sodium and potassium permanganates for a period of from about 30 to 180 minutes and at a temperature of from about 0° C. to 100° C., thereafter treating said alkaline solution with activated carbon, forming and precipitating terephthalic acid by adding the treated solution to a second acid having an ionization constant greater than that of terephthalic acid, separating the precipitated acid therefrom, and then washing the thus-separated terephthalic acid with hot water.

3. A process for purifying crude terephthalic acid obtained by the oxidation of para-dialkylbenzene in the liquid phase by means of an oxygen-containing gas which comprises the steps of dissolving said crude terephthalic acid in aqueous ammonium hydroxide to form the ammonium salt of said terephthalic acid in solution, subjecting the solution containing the ammonium salt to contact with at least 3 percent on the weight of said terephthalic acid of an agent selected from the group consisting of sodium and potassium dichromates and sodium and potassium permanganates for a period of from about 30 to 180 minutes and at a temperature of from about 0° C. to 100° C., thereafter treating said ammonium salt with activated carbon, forming and precipitating terephthalic acid by adding the solution containing the ammonium terephthalate to a second acid having an ionization constant greater than that of terephthalic acid, separating the precipitated acid therefrom, and then washing the thus-separated terephthalic acid with hot water.

4. A process for purifying crude terephthalic acid obtained by the oxidation of para-dialkylbenzene in the liquid phase by means of an oxygen-containing gas which comprises the steps of dissolving said crude terephthalic acid in an aqueous solution containing sodium hydroxide to form sodium terephthalate in solution, subjecting the solution containing the sodium terephthalate to contact with at least 3 percent on the weight of said crude terephthalic acid of an agent selected from the group consisting of sodium and potassium dichromates and sodium and potassium permanganates for a period of from about 30 to 180 minutes and at a temperature of from about 0° C. to 100° C., thereafter treating the sodium terephthalate with activated carbon, forming and precipitating terephthalic acid by adding the solution containing the sodium terephthalate to a second acid having an ionization constant greater than that of terephthalic acid, separating the precipitated acid therefrom, and then washing the thus-separated terephthalic acid with hot water.

5. A process for purifying crude terephthalic acid obtained by the oxidation of para-dialkylbenzene in the liquid phase by means of an oxygen-containing gas which comprises the steps of dissolving said crude terephthalic acid in an aqueous solution of ammonium hydroxide to form ammonium terephthalate, subjecting said ammonium terephthalate to contact in an aqueous solution with potassium permanganate for a period of from about 30 to 180 minutes and at a temperature of from about 0° C. to 100° C., the amount of said potassium permanganate being in the order of about 3 percent to about 4 percent by weight based on the weight of crude terephthalic acid, treating said alkaline solution with activated carbon, forming and precipitating terephthalic acid by adding the thus-treated solution to sulfuric acid, separating the precipitated terephthalic acid therefrom, and then washing the thus-separated terephthalic acid with hot water.

6. A process for purifying crude terephthalic acid obtained by the oxidation of para-dialkylbenzene in the liquid phase by means of an oxygen-containing gas which comprises the steps of dissolving said crude terephthalic acid in an aqueous solution of ammonium hydroxide to form ammonium terephthalate, subjecting said ammonium terephthalate to contact in an equeous solution with potassium permanganate for a period of time of about 30 minutes to about 180 minutes at a temperature of from about 25° C. to about 50° C., the amount of said potassium permanganate being in the order of about 3 percent to about 4 percent by weight based on the weight of crude terephthalic acid, treating said alkaline solution with activated carbon, forming and precipitating terephthalic acid by adding the thus-treated solution to hydrochloric acid, separating the precipitated terephthalic acid therefrom, and then washing the thus-separated terephthalic acid with hot water.

References Cited in the file of this patent

UNITED STATES PATENTS

| | | |
|---|---|---|
| 1,692,927 | Calcott et al. | Nov. 27, 1928 |
| 2,792,420 | Broich et al. | May 14, 1957 |
| 2,879,288 | Grossinsky et al. | Mar. 24, 1959 |
| 2,899,466 | O'Neill | Aug. 11, 1959 |

FOREIGN PATENTS

| | | |
|---|---|---|
| 777,782 | Great Britain | June 26, 1957 |
| 965,231 | Germany | June 6, 1957 |